(12) United States Patent
Otwell et al.

(10) Patent No.: US 12,225,890 B2
(45) Date of Patent: Feb. 18, 2025

(54) FLOATING WATER CIRCULATOR

(71) Applicants: Nathan Otwell, Oshoto, WY (US); Shondah Otwell, Oshoto, WY (US)

(72) Inventors: Nathan Otwell, Oshoto, WY (US); Shondah Otwell, Oshoto, WY (US)

( * ) Notice: Subject to any disclaimer, the term of this patent is extended or adjusted under 35 U.S.C. 154(b) by 198 days.

(21) Appl. No.: 18/101,783

(22) Filed: Jan. 26, 2023

(65) Prior Publication Data

US 2024/0251751 A1    Aug. 1, 2024

(51) Int. Cl.
*A01K 7/04*      (2006.01)

(52) U.S. Cl.
CPC .................................... *A01K 7/04* (2013.01)

(58) Field of Classification Search
CPC ....................................................... A01K 7/04
See application file for complete search history.

(56) References Cited

U.S. PATENT DOCUMENTS

| | | | | |
|---|---|---|---|---|
| 4,470,371 A * | 9/1984 | Strickland | ................ | A01K 7/04 137/414 |
| 4,628,867 A * | 12/1986 | Brougham | ............... | A01K 7/04 119/78 |
| 7,007,634 B1 * | 3/2006 | Pederson | ................ | A01K 7/04 119/78 |

\* cited by examiner

*Primary Examiner* — P. Macade Nichols
(74) *Attorney, Agent, or Firm* — Tracy Parris

(57) ABSTRACT

A floating water circulator (FWC) expels water at or near a water surface, providing kinetic energy, mixing, and/or temperature destratification while retarding formation of ice and/or insect reproduction in bodies of water with varying depth and/or debris, and while consuming significantly less power than a heater. An FWC includes a float configured to maintain buoyancy, allowing the FWC to rise and fall with water elevation. An FWC may provide shallow water operation. A pump may be configured to pump subsurface water from the body of water into a distributor. The distributor may be configured to receive, distribute and discharge the pumped water in multiple directions at or near the water surface through a plurality of outlets located in a side and/or a bottom of the FWC to ripple the water surface while suppressing/inhibiting splashing that may disturb livestock or induce freezing. FWC operation may be adaptable to deployment conditions.

20 Claims, 9 Drawing Sheets

FLOATING WATER CIRCULATOR

BACKGROUND

Stagnant water (e.g., in containers/tanks and/or ponds) may pose health risks to humans and/or animals. For example, livestock may depend on a relatively shallow body of water (e.g., in a stock tank) that may be prone to freezing in cold weather and/or insect breeding in warm weather.

SUMMARY

This Summary is provided to introduce concepts in a simplified form. These concepts are described in greater detail below in the sections entitled Detailed Description, Brief Description of the Drawings, Claims, and in the figures. This Summary is not intended to identify key or essential features of the described or claimed subject matter, nor limit the scope thereof.

Systems, methods, and instrumentalities are disclosed for a floating water circulator (e.g., water rippler). Floating water circulators may be used to circulate water to provide kinetic energy, mixing, and/or temperature destratification. Water may be expelled at or near the surface (e.g., by providing undulations, such as waves, ripples or other surface disturbances with insignificant splashing) to retard the formation of ice and/or insect reproduction in exposed water containers that may have varying depth and/or debris (e.g., stock tanks). Operating at a fraction of the power consumption and associated cost of a heater, a floating water circulator may include a float configured to maintain buoyancy of the floating water circulator in a body of water, e.g., to rise and fall with water surface. A pump may be configured to pump subsurface water from the body of water into a distributor. The distributor may be configured to receive (e.g., from one or more inlets), distribute and discharge the pumped water in multiple directions at or near the surface of the body of water through a plurality of outlets located in a side and/or a bottom of the floating water circulator to ripple a surface of the body of water while suppressing/inhibiting splashing.

Further features and advantages of the inventions, as well as the structure and operation of various embodiments, are described in detail below with reference to the accompanying drawings. The invention is not limited to the examples or embodiments described herein. Examples and embodiments are presented herein for illustrative purposes only. Additional embodiments will be apparent to persons skilled in the relevant art(s) based on the teachings provided herein.

BRIEF DESCRIPTION OF THE DRAWINGS

The drawings, summary, detailed description and claims individually and collectively present non-limiting examples. Unless expressly indicated otherwise, each figure represents a different example with different numbering.

DETAILED DESCRIPTION

Figure 1:
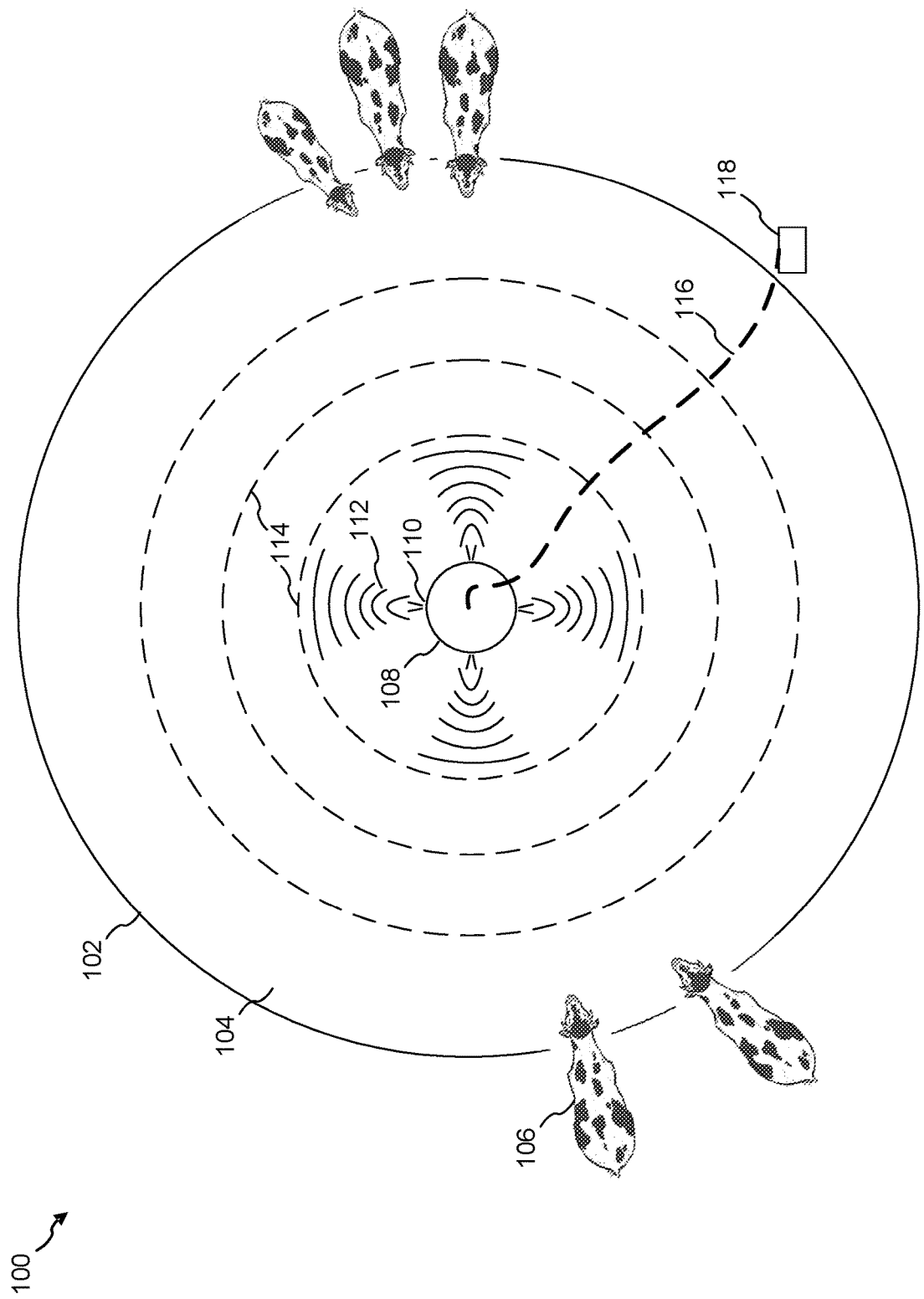
FIG. 1 illustrates an example of an environment in which a floating water circulator may be implemented, according to an embodiment.

A detailed description of illustrative embodiments will now be described with reference to the various Figures. Although this description provides examples of possible implementations, it should be noted that details provided in examples are intended to be exemplary and in no way limit the scope of the application. The present technology may be practiced without these specific details. The present technology is intended to cover alternatives, modifications, and equivalents, which may be included within the spirit and scope the various embodiments as defined herein, including by the appended claims. In addition, in the following detailed description, numerous specific details are set forth in order to provide a thorough understanding of the present technology. However, the present technology may be practiced without these specific details. In other instances, methods, procedures, components, circuits, etc. known to those of ordinary skill have not been described in detail as not to unnecessarily obscure aspects of the embodiments presented.

References in the specification to "embodiment," "example embodiment," or the like, indicate that the embodiment described may include a particular feature, structure, characteristic or step, but every embodiment may not necessarily include the particular feature, structure, characteristic or step. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Certain terms are used throughout the following description and claims to refer to particular system components and configurations. As one skilled in the art will appreciate, various skilled artisans and companies may refer to a component by different names. The discussion of embodiments is not intended to distinguish between components that differ in name but not function. In the following discussion and in the claims, the terms "including" and "comprising" are used in an open-ended fashion, and thus should be interpreted to mean "including, but not limited to . . . " Also, the terms "attached" and "coupled" are intended to mean either an indirect or direct connection.

Stagnant water (e.g., in containers/tanks and/or ponds) may pose health risks to humans and/or animals. For example, livestock may depend on a relatively shallow body of water (e.g., in a stock tank) that may be prone to freezing in cold weather and/or insect breeding in warm weather. Water levels and debris may vary daily in confined bodies of water (e.g., due to animal consumption and/or evaporation). Animals and/or weather may introduce debris into a body of water. There are options to contend with various water issues, but each is problematic. Breaking ice is time consuming and hazardous. Heaters consume significant electricity (e.g., 1500 watts of electricity per hour or 1.5 kWh) and require power supply infrastructure. Mounted/fixed circulators do not function when water levels drop. Circulators do not function when they become clogged with debris. Aerators cause water to cool and freeze faster in cold ambient temperatures and/or to evaporate more quickly in hot ambient temperatures. Bubblers keep only a small hole open (e.g., too small for animals). A water circulator may be subject to varying water depths, debris, ice buildup, movement by animals, sunlight, high temperatures, hail, etc. A water circulator may be used in areas where there is no power supply, e.g., limited to battery-powered operation. The various issues render existing water circulating solutions for bodies of water insufficient to provide open water capable of maintaining a healthy supply of water.

Systems, methods, and instrumentalities are disclosed for a floating water circulator (e.g., water rippler). Floating water circulators may be used to circulate water to provide kinetic energy, mixing, and/or temperature destratification. Water may be expelled at or near the surface (e.g., by providing undulations, such as waves, ripples or other surface disturbances with insignificant splashing) to retard the formation of ice and/or insect reproduction in exposed water containers that may have varying depth and/or debris (e.g., stock tanks). Operating at a fraction of the power consumption and associated cost of a heater, a floating water circulator may include a float configured to maintain buoyancy of the floating water circulator in a body of water, e.g., to rise and fall with water surface. A pump may be configured to pump subsurface water from the body of water into a distributor. The distributor may be configured to receive (e.g., from one or more inlets), distribute and discharge the pumped water in multiple directions at or near the surface of the body of water through a plurality of outlets located in a side and/or a bottom of the floating water circulator to ripple a surface of the body of water while suppressing/inhibiting splashing.

A floating water circulator may be constructed of one or more pieces or components, which may or may not be disassemblable/reassemblable (e.g., for adjustments, maintenance, repairs, replacement). A floating water circulator may comprise separable pieces that form an accessible (e.g., waterproof) interior cavity (e.g., a first piece coupled or configured to couple, seal, or clamp to a second piece, such as by a hinge, removable clamp, bolt, etc.). One or more pieces may be foam with a protective coating or shell. An accessible interior cavity may provide access to at least one component, such as at least a portion of at least one of the float, distributor, pump, ballast, electrical connection, etc. In some examples, a first piece may comprise an upper piece (e.g., a cap, lid, cover, or dome) configured with a protective shape (e.g., sloped, angled, curved, convex, or dome shape, layer, or coating (e.g., protective surface or layer, such as metal or a spray, paint or dip coating) to protect the floating water circulator (e.g., and/or the float) against damage by sunlight, impacts, water, and/or ice accumulation.

A float may comprise (e.g., in whole or in part) an inflatable device, rigid (e.g., spray, injected, extruded) insulation, and/or other material(s) (e.g., material(s) less dense than water, such as less than to equal 1 g/cm$^3$). A float (e.g., rigid insulation) may comprise a distributor, for example, as a water flow channel formed (e.g., in whole or in part) in the float (e.g., in rigid insulation), as a hose, a pipe, and/or a tube placed in or embedded in the float (e.g., protected, surrounded, insulated by the float). A float may include one or more outlets, which may eject pumped water through the float (e.g., a side or a bottom of the float). In some examples, a float may comprise a support (e.g., a flange) configured to retain a pump (e.g., to join the float and pump).

A distributor may be implemented wholly or partly within (e.g., embedded in) or external to the float and/or an external body of the floating water circulator. For example, a distributor may be implemented as a tube wholly or partly around or inside the float, a channel formed in the float (e.g., so that the float is both float and distributor), etc. In an example, a float may be implemented with rigid insulation. A distributor may be formed or embedded in the rigid insulation, with outlets in the side and/or bottom of the rigid insulation. A distributor may include one or more chambers with one or more outlets, for example, to equalize or balance flows out of multiple outlets, which may support maintaining position of the floating water circulator in a container with or without a submerged or above water tether. A chamber may be referred to, for example, as a reservoir, channel, conduit, duct, vessel, etc.

Outlets may be configured to discharge the pumped water at or near a surface of the body of water to ripple the surface of the body of water while suppressing/inhibiting splashing, e.g., without significant splashing, which may disturb animals and/or lead to premature freezing. The outlets may be positioned on a side and/or a bottom of the floating water circulator. Outlets may include ports with or without nozzles. Outlets (e.g., and/or distributor flow paths to outlets) may be configurable to adapt the floating water circulator to operating conditions. For example, one or more outlets may be adaptable/variable by supporting one or more of the following: selection of open and closed (e.g., pluggable) outlet positions, nozzle size, outlet direction, outlet elevation, outlet angle, etc. Adaptations (e.g., field adaptations) of an adaptable floating water circulator may be based on one or more of the following: the shape of a container of the body of water, the dimensions of a container of the body of water, a temperature of the air, a temperature of the water, the pump, a user preference, etc. For example, a plurality of outlets may be configured (e.g., by an installer or user) to expel water with a proportional (e.g., equal) volume and/or flow rate (e.g., force) on opposing sides. Proportionality of volume and/or flow may be selected, for example, based on the positioning of the floating water circulator, a shape of the container, maximizing a rippled or ice-free surface of water, maintaining a position of the floating water circulator in a container with or without a submerged or above water tether, etc.

A pump may comprise, for example, a wet/submersible pump, dry/non-submersible pump with one or more intakes in the body of water. A pump may be an inline pump. A pump may be partially or fully recessed (e.g., embedded, integrated, concealed) within the float or may be separate from the float. In some examples, a pump (e.g., pump flow rate) may be variable (e.g., statically or dynamically adaptable/configurable) to adapt the floating water circulator. Manual and/or automated variation control(s) may be based on at least one of the following: the shape of a container of the body of water, the dimensions of a container of the body of water, a temperature of the air, a temperature of the water, and/or a user preference. A pump may be configured to self-clean, e.g., to remove debris that is clogging or may clog a water intake. For example, a pump may (e.g., periodically and/or ad hoc) temporarily reverse pump flow to clear debris and/or a portion of the pumped water may be redirected towards one or more pump intakes to clear debris. A diverter may be configured to divert a portion of the pumped water to divert debris from a water intake for the pump. A pump controller may control a pump to vary (e.g., modulate) at least one of a direction of flow (e.g., to reverse flow to periodically clean based on a timer and/or aperiodically based on detection of reduced flow/clog detection) and/or a pump flow rate (e.g., to increase or decrease flow, such as based on air and/or water temperature sensors, based on clogging, and/or to avoid freezing, such as by increasing/ surging the frequency and/or magnitude of waves/ripples). For example, a controller may control a pump based on an air temperature (AT) sensor and/or a water temperature (WT) sensor, e.g., to reduce power consumption by remaining off or operating at a lower gallon-per-minute (GPM) flow rate and/or by increasing GPM flow rate during freezing temperatures. A self-cleaning, shallow intake pump may support a wide range of water levels and debris, which may be common in stock tanks.

A floating water circulator may include a support, e.g., to support a pump. A support may be configured to retain (e.g., attach or mount) the pump to the float. A support may be an integrated support or a discrete support. A support may be assembled/constructed during manufacturing or assembled post manufacturing, as with a kit. A support may include, for example, one or more of the following: a coupler, retainer, mount, housing, bracket, strut, carrier, frame, holder, enclosure, threaded bolt(s) (e.g., plastic or metal) that couples to threads or a nut to support a pump, a clamp, etc. A pump may be supported (e.g., attached or mounted) to be inside cavity, held inside and suspended below, suspended completely below, and so on, such that a support may be internal and/or external to an FWC body, base or float. For example, a support may comprise a flange internal to the floating water circulator (e.g., mounted to the float or lower piece or base). The pump may rest on the flange. The pump (e.g., or a water inlet) may protrude, at least partially, below a body of the floating water circulator (e.g., float or lower piece). In some examples, the support may comprise a support suspended from and protruding below a body of the floating water circulator. For example, a support may include one or more supports embedded in or through the lower piece or float, which may permit adjustment, removal and/or replacement of a pump.

A pump controller may control operation of the pump. The pump controller may control the inputs/intakes, outputs, flow direction, flow rate, continuous operation or modulated (e.g., discrete ON/OFF or continuously varying modulation) operation (e.g., asymmetric or symmetric pattern), etc. In some examples, a pump controller may use a flow sensor to determine whether to dynamically vary (e.g., modulate) the pump, e.g., to clear debris clogging a water intake, which may be indicated by sensing reduced flow. In some examples, a pump controller may use a temperature sensor to determine whether to vary (e.g., modulate) the pump (e.g., in terms of flow rate, flow volume, ON/OFF cycling). For example, a pump controller may increase flow when a cold temperature is below a threshold or when a hot temperature is above a threshold. Increased agitation, introducing more energy into water, may prevent freezing.

In some examples, the floating water circulator may include a swivel bearing, e.g., to permit the floating water circulator to rotate without twisting at least one of a tether or an electrical cord as the floating water circulator moves (e.g., rotates) in the body of water. For example, a floating water circulator may be tethered to the bottom, side(s), and/or top of a water container (e.g., tank), a position guide (e.g., stainless steel cable, spacer bar, netting) in or above the water container to maintain a position of the floating water circulator relative to the water container and/or relative to other floating water circulators (e.g., ganged floating water circulators coupled to one or more spacers for organized operation/interaction).

Water ripples or waves generated by an FWC may be discrete in one or more directions or omnidirectional. An FWC or FWC components may have any shape, e.g., round, square, rectangular, oblong, triangular, pyramidal, etc. One or more FWC components may be constructed from, for example, Aluminum, steel, plastic, polymer, polystyrene, polyethylene, rubber, etc. In some examples, a heater (e.g., an inline heater) may be used to heat pumped water. A heater may be controlled by a controller, for example, based on air and/or water temperature(s). An FWC may be powered by any power source, such as a battery, propane, gas, diesel, wind, or solar powered electric generator, a line voltage outlet, etc.

FIG. 1 illustrates an example of an environment in which a floating water circulator may be implemented, according to an embodiment. Example environment 100 shows container 102 containing a body of water 104 consumed by livestock 106, where body of water 104 may be circulated by floating water circulator (FWC) 108.

Container 102 may be natural (e.g., earthen) or manmade. Container 102 may be above ground or wholly or partially in-ground. Container 102 may have any dimensions and shape. Container 102 may be, for example, a stock tank.

Livestock 106 may be any type and quantity. Container 102 need not be accessible by any livestock to deploy FWC 108.

Body of water 104 may have a natural or man-made supply of water. The water surface of body of water 104 may vary in elevation (e.g., water depth may vary). Debris may be introduced into body of water 104 naturally (e.g., wind driven leaves, dirt, etc.) and/or by livestock 106.

FWC 108 may (e.g., be configured to) circulate water in body of water 104, for example, by pumping subsurface water into a distributor that expels the pumped water through one or more outlets 110, which may be configurable. Water expelled at or below the surface of the water in body of water 104 may cause directional ripples 112 in various directions, which may continue as directional waves or merge into omnidirectional waves 114. A pump, outlets 110 and/or distributor associated with FWC 108 may be configured to generate ripples 112 and waves 114 for one or more purposes, such as retarding water freezing in cold weather and/or insect breeding in warm weather. FWC 108 may be tethered in place or untethered. In the example shown in FIG. 1, FWC 108 may be tethered to container or ground (not shown), e.g., under FWC 108.

FWC 108 may be powered by power source 118. Power source 118 may be included in (e.g., protected by) FWC 108 or remotely coupled to FWC 108 by underground and/or above ground conductor 116. Power provided by power source 118 may be, for example, a DC voltage provided by a battery, a transformer coupled to line voltage, a generator, etc. A battery may be charged by any source, e.g., line voltage, generator, and/or electricity generated by renewable energy (e.g., wind turbine, water turbine, and/or solar panel).

Figure 2:
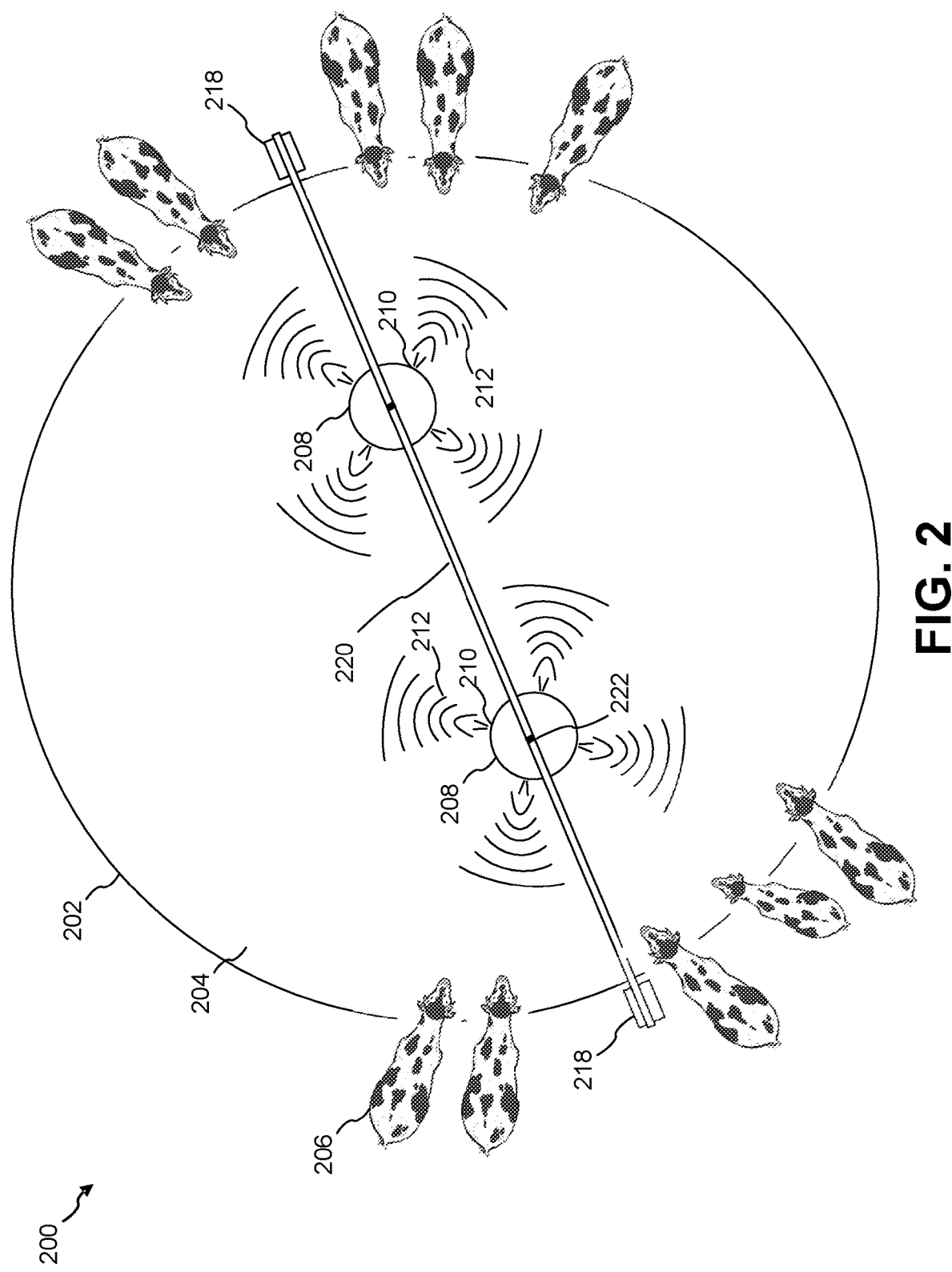
FIG. 2 illustrates an example of an environment in which a floating water circulator may be implemented, according to an embodiment.

FIG. 2 illustrates an example of an environment in which a floating water circulator may be implemented, according to an embodiment. Example environment 200 shows container 202 containing a body of water 204 consumed by livestock 206, where body of water 204 may be circulated by ganged floating water circulators (FWCs) 208.

Container 202 may be natural (e.g., earthen) or man-made. Container 202 may be above ground or wholly or partially in-ground. Container 202 may have any dimensions and shape. Container 202 may be, for example, a stock tank.

Livestock 206 may be any type and quantity.

Body of water 204 may have a natural or man-made supply of water. The water surface of body of water 204 may vary in elevation (e.g., water depth may vary). Debris may be introduced into body of water 204 naturally (e.g., wind driven leaves, dirt, etc.) and/or by livestock 206.

FWCs 208 may (e.g., be configured to) circulate water in body of water 204. The placement location, directionality, and operation of FWCs 208 may be configured to coordinate operation to achieve one or more objectives. Each FWC 208 may pump subsurface water into a distributor that expels the pumped water through one or more outlets 210, which may be configurable (e.g., closed, open, rate of flow, horizontal direction of flow, vertical direction of flow, nozzle size, and so on). Water expelled at or below the surface of the water in body of water 204 may cause directional ripples 212 in various directions, which may continue as directional waves 212 or merge into omnidirectional waves. A pump, outlets 110 and/or distributor associated with each FWC 208 may be configured to generate ripples 212 and waves for one or more purposes, such as retarding water freezing in cold weather and/or insect breeding in warm weather. Each FWC 208 may be tethered in place or untethered. In the example shown in FIG. 2, each FWC 208 may be tethered in a location supporting coordinated operation. For example, as shown in FIG. 2, each of two FWCs 208 may be placed, oriented and tethered closer to the perimeter of container 202 to better prevent surface ice near opposing perimeter locations (e.g., livestock accessible drinking locations) and/or to allow ripples from different FWCs 208 to merge into larger waves. Tethers 222 may be configured for example, to allow or not allow one or more of up/down movement of FWCs 208 and/or rotation of FWCs 208.

FWCs 208 may be powered by power source(s) 218. Power source(s) 218 may be included in (e.g., protected by) FWCs 208, coupled to support 220, or remotely coupled to FWCs 208 by underground and/or above ground conductor (not shown). Power provided by power source(s) 218 may be, for example, a DC voltage provided by a battery, a transformer coupled to line voltage, a generator, etc. A battery may be charged by any source, e.g., line voltage, generator, and/or electricity generated by renewable energy (e.g., wind turbine, water turbine, and/or solar panel). For example, one or more solar panels and/or wind turbines may be mounted to support 208, e.g., above FWCs 208, to trickle charge batteries 218, which may (e.g., also) be mounted to support 220, e.g., above FWCs 208. Support 220 may act as a rigid spacer for multiple FWCs 208. In some examples, support 220 may be a spacer/support that does not extend over the edges of container 202. Support 220 may serve multiple purposes, such as a spacer for FWCs 208, a support for one or more power sources, a cable guide, tether support and/or locations, a safety suspension for FWCs, a conduit for one or more of power conductors, communication cables or electronics, etc.

Figure 3:
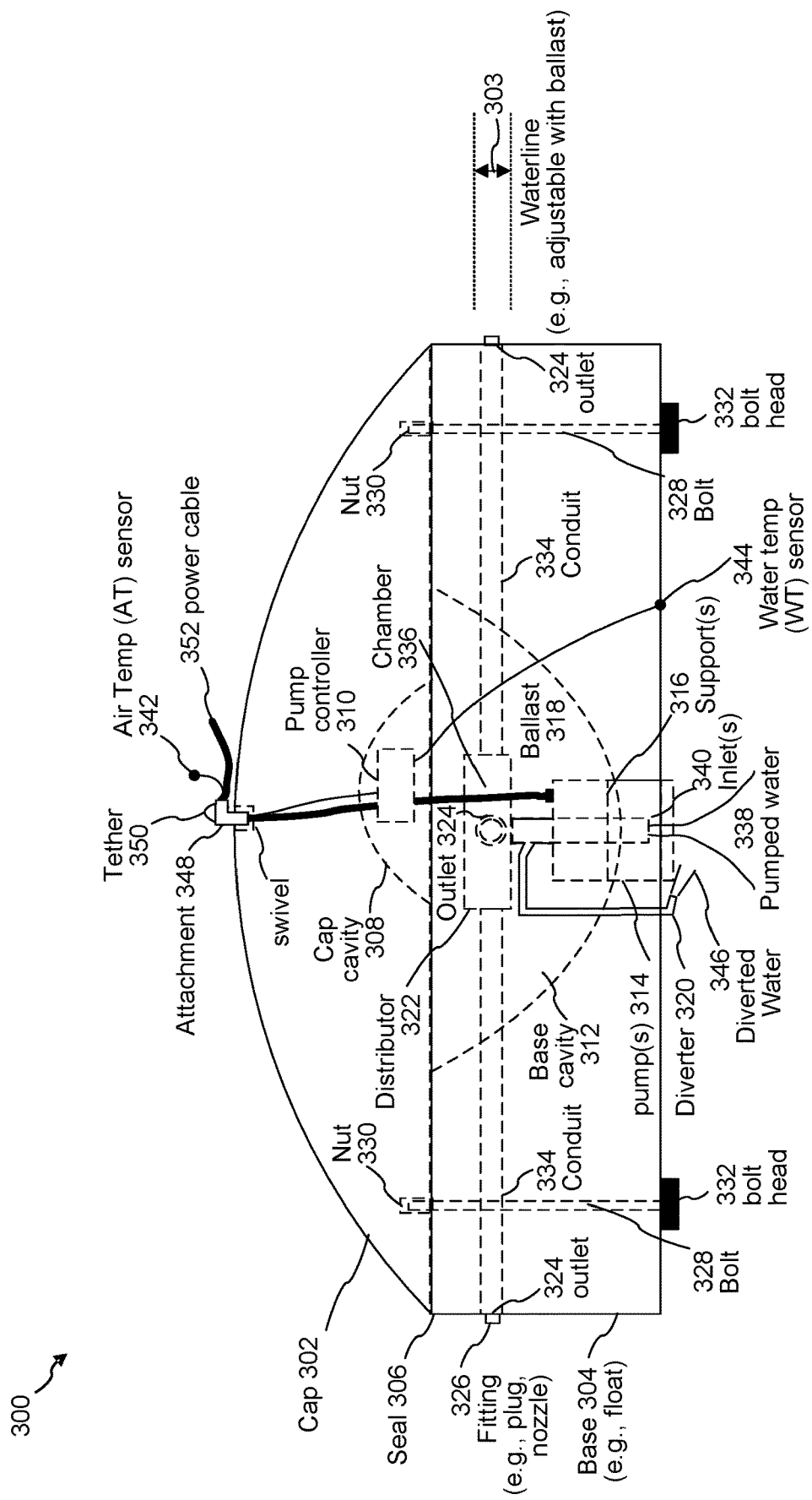
FIG. 3 illustrates an example of a side view of a floating water circulator, according to an embodiment.

FIG. 3 illustrates an example of a side view of a floating water circulator, according to an embodiment. Example FWC 300 shows one of many possible implementations of an FWC. FWC 300 may be configured to float in body of water 301, which may be in a man-made or natural container, such as an earthen pond or a stock tank. FWC 300 may be configured to operate with debris in shallow depths. One or more FWCs 300 may be configured to circulate water with insignificant splashing in shallow water, rising and falling with the surface elevation as the depth of body of water 301 changes daily, weekly, monthly, etc.

As shown in FIG. 3, FWC 300 comprises a cap 302 and base 304. Cap 302 and base 304 may be sealed by seal (e.g., gasket) 306. Seal 306 may be, for example, a permanent or removable/replaceable form fit shape between cap 302 and base 304, a sealant, a gasket, etc. In some examples, an FWC may be implemented with a single floatable piece and in other examples an FWC may be implemented with more than two pieces.

Cap 302 and base 304 may be disassemblable/reassemblable, for example, for a user to make adjustments to components, add or remove components, perform maintenance or repairs on components, and/or replace components. FWC 300 may include one or more accessible cavities. For example, cap 302 may include cap cavity 308, which may hold or provide accessibility to one or more components, such as pump controller 310 and one or more cables and/or connections for power and/or communication. Base 304 may include base cavity 312, which may hold or provide accessibility to one or more components, such as pump(s) 314, support (e.g., flange) 316, ballast 318, diverter 320, distributor 322, one or more cables and/or connections for power and/or communication, etc.

Cap 302 and base 304 may be fastened (e.g., coupled, sealed, or clamped) together, for example, by a hinge, removable clamp, bolt, liquid sealant, etc. For example, as shown in example FWC 300, base 304 may be secured to cap 302 by inserting bolt 328 though base 304 and threading into nut 330 affixed to (e.g., embedded in) cap 302. Bolt head 332 may serve as feet or pads for FWC 300. For example, a height of bolt head 332 may be configured to protect components (e.g., pump(s) 314, diverter 320) by keeping them at or above a surface that bolt heads 332 (e.g., feet, pads) rest on to reduce pressure or impact and damage to the protected components.

Cap 302 may comprise an upper piece (e.g., a top, lid, cover, or dome) configured to fit on or over base 304 (e.g., bottom or float). Cap 302 may be configured with a protective shape (e.g., sloped, angled, curved, convex, or dome shape), for example, to protect against damage by standing water, ice accumulation, hail, etc. Cap 302 and/or base 304 may have a protective material, layer, coating (e.g., protective surface or layer, such as metal or a spray, paint or dip coating, anti-microbial, UV stable layer), shape, texture (or lack thereof), bumper, etc., to protect against damage by sunlight, heat, impacts, algae, bacterial, mold, etc. For example, base 304 and/or cap 302 may be foam with a protective coating (e.g., polyurea) or shell. Base 304 (e.g., and cap 302) may include material(s) less dense than water, e.g., a density less than 1 g/cm$^3$, to configure FWC 300 to float in body of water 301. For example, base 304 (e.g., float) may comprise (e.g., in whole or in part) an inflatable device, rigid (e.g., spray, injection molded, extruded) insulation (e.g., polyurethane), and/or other material(s). Base 304 (e.g., and/or cap 302) may include distributor 322.

Distributor 322 may be implemented wholly or partly within (e.g., embedded in) FWC 300 and/or external to FWC 300. For example, a distributor may be implemented as a tube wholly or partly around or inside the float portion of an FWC, such as a channel formed in the float so that the float is both float and distributor, etc. In an example, a float may be implemented with a buoyant material such as foam or rigid insulation. A distributor may be formed or embedded in the foam or rigid insulation, with outlets in the side and/or bottom of the rigid insulation. Distributor 322 may include one or more water flow (e.g., distribution) conduits 334 (e.g., flow channels) formed or embedded (e.g., in whole or in part) in the base/float material (e.g., rigid insulation). For example, distributor 322 may include as conduits 334 a hose, a pipe, and/or a tube placed in or embedded in the base/float material and/or one or more distribution flow channels molded, cut, carved, heat-formed (e.g., melted), or otherwise formed in base/float material (e.g., protected, surrounded, insulated by the float).

Distributor 322 may include chamber 336. Chamber 336 may equalize the pressure of water flowing in from one or more pumps 314 to multiple conduits 334 and out multiple outlets 324 (e.g., ports). Equalizing, balancing, or otherwise controlling flows out of multiple outlets 324 may support maintaining position of FWC 300 in a container with or without a submerged or above water tether. Chamber 336 may be referred to, for example, as a reservoir, vessel, etc. Conduits 334 may be referred to as channels, ducts, etc. Conduits 334 may include or lead to outlets 324, which may eject pumped water through a side or a bottom of FWC 300.

Outlets 324 (e.g., ports) may be configurable. Outlets 324 may be configured to discharge pumped water 338 at or near a surface of the body of water (e.g., waterline 303) to cause ripples or waves in the surface of the body of water while suppressing/inhibiting splashing, e.g., without significant splashing, which may disturb animals and/or lead to premature freezing or evaporation depending on ambient conditions. Outlets 324 may be positioned on a side and/or a bottom of FWC 300.

FWC 300 may be adaptable. Pump(s) 314, outlets 324, conduits 334, and/or chamber(s) 336 may be configurable to adapt FWC 300 for variable operation, e.g., based on variable conditions. Outlets 324 may have fittings 326 (e.g., terminations), such as plugs, nozzles, etc. In some examples, outlets 324 may incorporate or may receive (e.g., as inserts) nozzles, plugs or other water flow control devices. Outlets 324 may be coupled to terminations, for example, by slip/compression fit, threads, clamp, sealant or adhesive, etc. For example, a nozzle or plug may be screwed into threaded outlets 324. Outlets 324 and/or fittings 326 may be configurable. For example, one or more outlets may be adaptable/variable by supporting one or more of the following: selection of open and closed (e.g., pluggable) outlet positions, nozzle or outlet size, direction, elevation, angle, etc. For example, a nozzle may be adjusted for full flow, no flow (e.g., plug) and/or discrete or continuous levels of flow there between.

Adaptations (e.g., field adaptations) of an adaptable FWC may be based on one or more of the following: the shape and/or dimensions of a container containing body of water 301, a temperature of the air, a temperature of the water, the pump(s), the number and/or configuration of FWCs, a user preference, etc. For example, a plurality of outlets (e.g., outlets 324 and/or fittings 326) may be configured (e.g., by an installer or user) to expel water with a proportional (e.g., equal) volume and/or flow rate (e.g., force) on opposing sides. Proportionality of volume and/or flow may be selected, for example, based on the positioning of FWC 300 in body of water 301 and/or a container, the number and position of FWCs, a shape of the container, goals in creating ripples or waves in body of water 301, such as maintaining ice-free surface or zones, maintaining a position of the floating water circulator in a container with or without a submerged or above water tether, etc.

Pump(s) 314 may comprise, for example, a wet/submersible pump, dry/non-submersible pump with one or more inlet(s) 340 in body of water 301. Pump(s) 314 may be an inline pump. Pump(s) 314 may be partially or fully recessed (e.g., embedded, integrated, concealed) within FWC 300 (e.g., base 304, which may be or may include a float) or may be separate from one or more components of FWC 300. For example, pump(s) 314 may be supported by support 316, which may be a gasketed flange, gasketed clamp, etc. Pump(s) may be fixed or variable speed. Pump(s) 314 may be controlled by pump control 310. In some examples, operation of pump(s) 314 (e.g., pump flow rate) may be variable (e.g., statically or dynamically adaptable/configurable) to adapt FWC 300 to a variety of conditions. Manual and/or automated variation of operation of pump(s) 314 (e.g., by pump control 310) may be based on at least one of the following: the shape and/or dimensions of a container containing body of water 301, a temperature of the air (e.g., ambient air temperature), a temperature of the water (e.g., ambient water temperature), the type and/or number of pump(s), the number and/or configuration of FWCs, a user preference, etc.

Pump controller 310 may control operation of pump(s) 314. Pump controller 310 may control, for example, flow valves (e.g., in inlet(s) 340), flow direction, flow rate, continuous operation or modulated operation (e.g., discrete ON/OFF or continuously varying modulation in an asymmetric or symmetric pattern), etc. Pump controller 310 may control pump operation, for example, as pulsed or continuous flow, fixed or variable volume and/or rate of flow, etc.

Pump(s) 314 may be configured (e.g., operated by pump control 310) to self-clean, e.g., to remove debris that is clogging or may clog water inlet(s) 340 (e.g., water intake(s)). For example, pump(s) 314 may (e.g., periodically and/or aperiodically, ad hoc, or based on an event) temporarily stop pump flow, slow or increase flow rate, and/or reverse pump flow, e.g., to clear debris, and/or a portion of the pumped water may be redirected towards one or more pump intakes, e.g., to clear debris. For example, pump controller 310 may control pump(s) 314 to vary (e.g., modulate) a direction of flow (e.g., to reverse flow to periodically clean based on a timer and/or aperiodically based on detection of reduced flow/clog detection). For example, diverter 320 may be configured (e.g., based on a timer or an event) to divert a portion of pumped water 338 as diverted water 346 to divert debris from water inlet(s) 340. In some examples, diverter 320 may be enabled/disabled, for example, by plugging diverter 320 to disable operation and unplugging diverter 320 to enable operation. In some examples, pump controller 310 may use a flow sensor (e.g., in inlet(s) 340) to determine whether to dynamically vary (e.g., modulate) the pump, e.g., to clear debris clogging a water intake, which may be indicated by sensing reduced flow.

In some examples, pump controller 310 may use a temperature sensor to determine whether to vary (e.g., modulate) the pump (e.g., in terms of flow rate, flow volume, ON/OFF cycling). Pump controller 310 may control pump(s) 314 to vary (e.g., modulate) pump flow rate, for example, to increase or decrease flow, e.g., based on data generated by air temperature (AT) sensor 342 and/or water temperature (WT) sensor 344. Pump controller 310 may base modulation determinations on one or more of a timer, detection of clogging, detection of freezing temperatures, etc. Pump controller 310 may, for example, increase/surge the frequency and/or magnitude of pumped water 338 to increase/surge waves/ripples created in body of water 301.

For example, pump controller 310 may control a pump based on AT sensor 342 and/or WT sensor 344, e.g., to reduce power consumption by remaining off or operating at a lower gallon-per-minute (GPM) flow rate in above freezing temperatures and/or by increasing GPM flow rate during freezing temperatures. Pump controller 310 may control pump(s) 314 for self-cleaning. For example, pump controller 310 may increase flow when AT 342 and/or WT 344 indicates a cold temperature is below a threshold. Increased agitation, introducing more energy into water, may prevent freezing.

Figure 5:
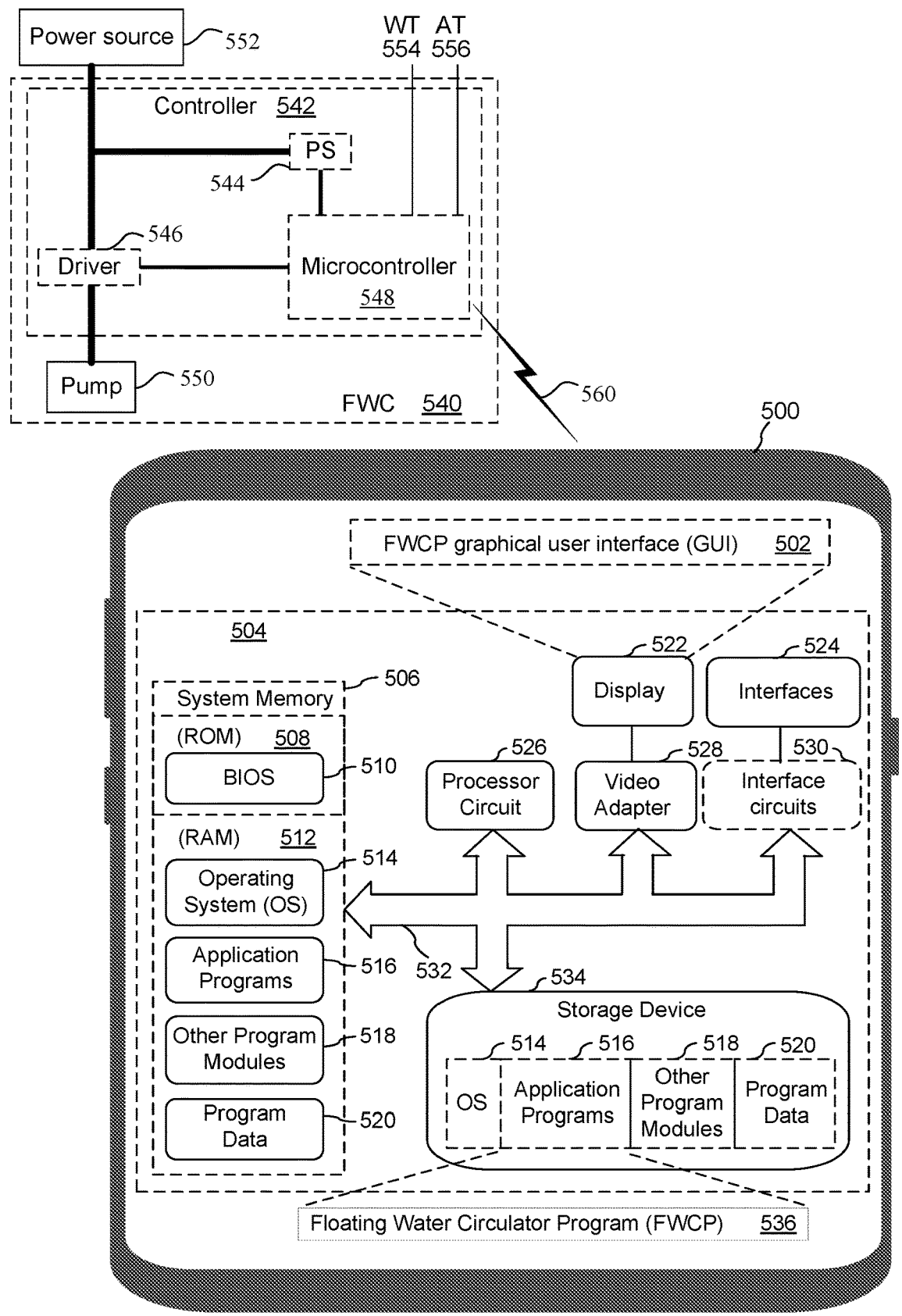
FIG. 5 illustrates an example of an intelligent floating water circulator, according to an embodiment.

Pump(s) 314 in FWC 300 may be configured to be shallow intake pump(s), which may support a wide range of water levels and debris common in stock tanks. In some example, pump controller 310 may be a sealed (e.g., waterproof) unit. In some examples, e.g., as shown in FIG. 5, pump controller 310 may communicate information (e.g., about configuration, sensor measurements, and/or operation) and/or be configured by a user (e.g., using a user interface, such as a downloaded application (app) executed by a computing device). In some examples, pump(s) 314 operation may be controlled (e.g., overridden), for example, by a float switch (not shown), thermal switch (not shown), etc.

Pump(s) 314 may be supported by support(s) 316. Support(s) 316 may allow pump(s) 314 may be mounted vertically, horizontally, angled, etc. In some examples, base 304 (e.g., float) may include support(s) 316 (e.g., flange, clamp). Support(s) 316 may be configured to retain (e.g., attach, mount, join, or otherwise support) pump(s) 314 to FWC 300. Support(s) 316 may be an integrated support or a discrete support. Support(s) 316 may be assembled/constructed during manufacturing or assembled post manufacturing, as with a kit. Support(s) 316 may include, for example, one or more of the following: a coupler, clamp, retainer, mount, housing, bracket, flange, strut, carrier, frame, holder, enclosure, fastener(s), such as threaded bolt(s) (e.g., plastic or metal), etc. Support(s) 316 may be internal and/or external to a body of FWC 300. Pump(s) 314 and/or support(s) 316 may be completely inside a cavity (e.g., base cavity 312), retained partially inside and partially suspended below a body of FWC 300, suspended completely below FWC 300, etc. For example, a support may comprise a flange internal to FWC 300 (e.g., mounted in base cavity 312). Pump(s) 314 may rest on the flange. A flange or other support may have a gasket, for example, to prevent water from entering around the perimeter of pump(s) 314. Pump(s) 314 (e.g., or water inlet(s) 340) may protrude, at least partially, below a body of FWC 300. In some examples (e.g., where shallow water operation may not be implemented), a pump may be accessible (e.g., for adjustment, removal and/or replacement) from the underside of FWC 300 based on support(s) 316 embedded in or passing through base 304 (e.g., float) or based on support(s) 316 suspended from and protruding below a body of FWC 300.

In some examples, the floating water circulator may include attachment 348, which may provide a tether for positioning, spacing from other FWCs and/or a movement guide (e.g., if FWC 300 is configured to have a range of movement), a cable/wire guide, etc. Attachment 348 is one of many examples. FWC 300 may be configured (e.g., with or without one or more tethers) to be in a fixed and/or variable position and/or a fixed or variable orientation. Attachments (e.g., attachment 348) may be located anywhere on FWC 300. There may be multiple attachments, such as on top, below, on a side, etc. For example, FWC 300 may be tethered to the bottom, side(s), and/or top of a water container (e.g., tank), a position guide (e.g., stainless steel cable, spacer bar, netting) in or above the water container to maintain a position of FWC 300 relative to the water container and/or relative to other FWCs (e.g., ganged FWCs coupled to one or more spacers for organized operation/interaction). In some examples, FWC 300 may include an attachment for a tether 350, power cable 352, a communication cable or wire, a sensor, and/or the like under FWC 300, which may avoid penetrations in cap 302. Attachment 348 may include a swivel bearing, e.g., to permit the floating water circulator to rotate or otherwise move without twisting at least one of a tether 350, power cable 352, a communication cable or wire, a sensor, etc., as FWC 300 moves (e.g., rotates) in the body of water.

Variations in manufacture or configuration of cap 302, body 304, weight of pump(s) 314, etc., may cause FWC 300 to float higher or lower in body of water 301. Ballast 318 may be added to or removed from FWC 300 (e.g., in base cavity 312 and/or to the exterior of FWC 300), for example, to vary the location of outlets 324 (and/or nozzles 326) relative to the waterline 303 (e.g., surface elevation) of body of water 301. Ballast 318 may be any material, such as lead weights, ball bearings, etc.

Figure 4:
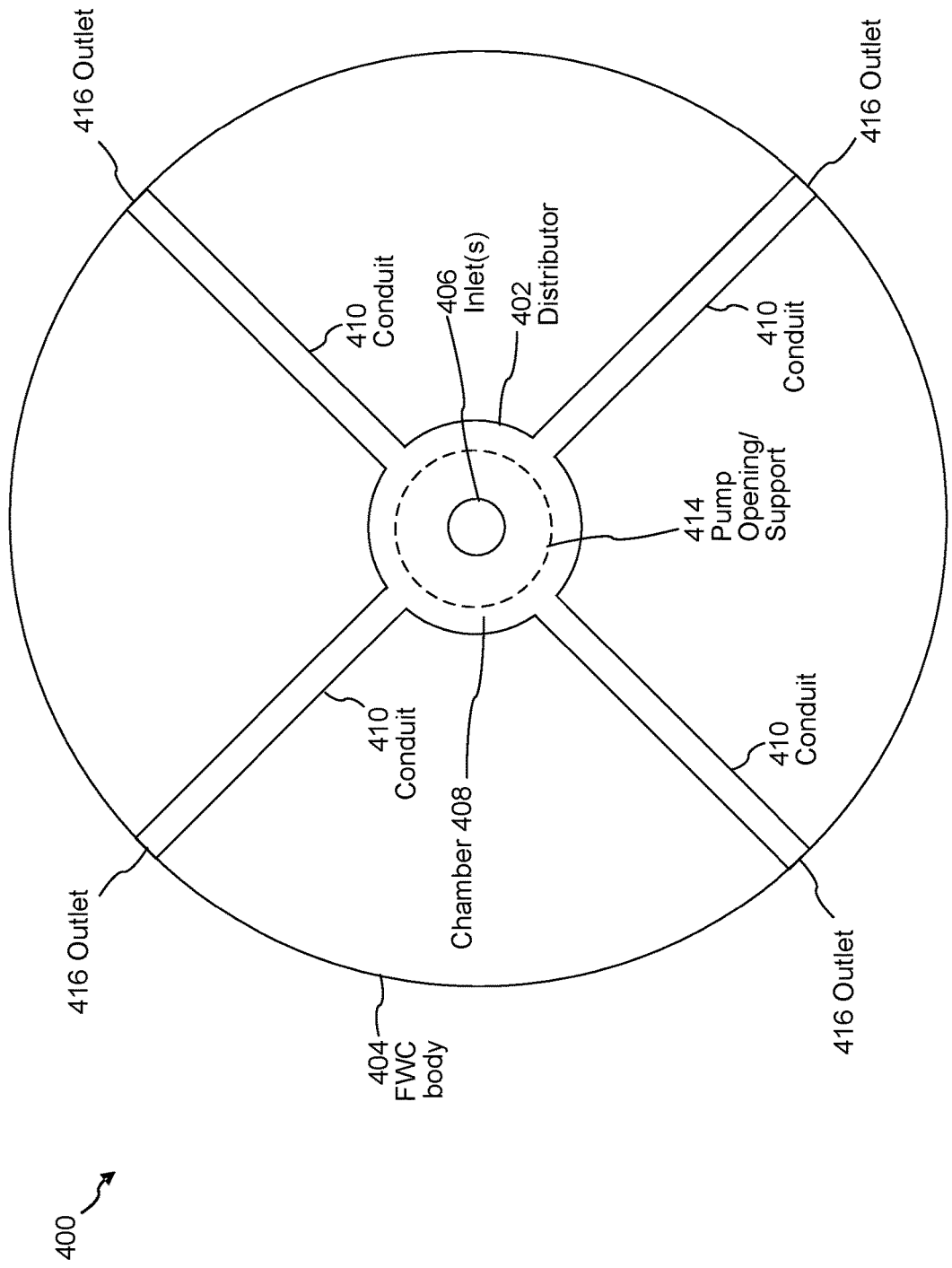
FIG. 4 illustrates an example of a top view of a floating water circulator, according to an embodiment.

FIG. 4 illustrates an example of a top view of a floating water circulator, according to an embodiment. Example FWC 400 shows distributor 402 relative to FWC body 404. Distributor 402 may include inlet(s) 406, chamber 408, and conduits 410. Distributor 402 components (e.g., inlet(s) 406, chamber 408, and conduits 410) may be, for example, discrete (e.g., plastic plumbing) component(s) clamped or glued together resting on or in FWC body 404 (e.g., shell with cavity and/or foamed FWC body 404 around distributor components) and/or integrated (e.g., formed) in FWC body 404, such as by molding, heat-forming (e.g., melting), milling, etc. One or more pumps (not shown) may be inset into FWC body 404 in pump opening/support 414, which may, for example, clamp the pump(s) to FWC body 404. A pump may pump water into chamber 408 portion of distributor 402 through chamber inlet(s) 406. For example, a pipe coupled to the output of a pump may be sealed at chamber inlet(s) 406. Pumped water may be dispersed from chamber 408 through conduits 410 to outlets 416. Various implementations of FWCs may have more or fewer conduits and outlets/ports than the four shown in example FWC 400, which may or may not be configured to accept fittings. In some examples, recessed pump opening/support 414 may be omitted and/or inlet(s) 406 may, e.g., alternatively, be an opening for an inlet pipe leading to an inline pump within a cavity (e.g., base cavity 312 and/or cap cavity 308 shown in FIG. 3).

FIG. 5 illustrates an example of an intelligent floating water circulator, according to an embodiment. FIG. 5 shows an example of communication between an FWC and a computing device, according to an embodiment. FIG. 5 shows an example of FWC 540 communicating with computing device 500 via wired or wireless communication 560 using one or more (e.g., near or far) communication technologies implemented in FWC 540 and computing device 500. Communication 560 may include operational/status information and/or control information (e.g., to permit use to configure operation of FWC 540 by selecting among default or customized operation).

Example FWC 540 may comprise, for example, example FWC 108, 208, 300, 400, 600, 700, 800, 900, or any other FWC. FWC 540 may comprise, for example, controller 542, power source 552 and pump 550. In some examples, controller 542 may be sealed in a waterproof module. Controller 542 may comprise, for example, power supply (PS) 544, driver 546 and microcontroller 548. Microcontroller 548 may be powered by PS 544, which receives power from power source 552 (e.g., 12 V battery, generator, line voltage converted to 12 V DC).

Microcontroller 548 may be a computer system on a chip (SoC) comprising components shown for computing device 500 (e.g., except display, video adapter). Microcontroller interface circuitry may include one or more wired and/or wireless communication interfaces for communication with computing device 500. Microcontroller 548 may be configured (e.g., factory configured) with one or more default or customizable programs. For example, one or more communication programs may be configured to communicate with computing device 500. One or more control programs may be configured to control FWC 540, such as by providing control of power driver circuit 546 to control a power profile provided to pump 550 (e.g., if pump 550 is a variable pump) based on one or more variables, e.g., water temperature (WT) 554 and/or air temperature (AT) 556. For example, a power saver program may turn off power to pump 550 based on a temperature of 60 degrees Fahrenheit to conserve power, running occasionally to circulate water. In some examples, FWC 540 may be programmed or customized for operation by user selection of physical DIP switches read by microcontroller 548. Configurable/selectable operation may include, for example, pump operation at various temperatures, power modulation cycles to avoid debris clogging, power conservation, etc.

Computing device 500 may be, for example, a cellular telephone, a personal digital assistant (PDA), a smartphone, a tablet, a laptop, a netbook, a personal computer, an Internet of Things (IoT) device, a watch or other wearable device, a head-mounted display (HMD) such as goggles or glasses, etc. Computing device 500 is a non-limiting example for purposes of illustration. Example embodiments may be implemented in other types of computer systems. Control (e.g., pump control) may be implemented in a computer program, software, and/or firmware incorporated in a computer-readable medium for execution (e.g., as one or more processes) by one or more processors (e.g., microcontrollers).

Examples of computer-readable media include, but are not limited to, electronic signals (transmitted over wired and/or wireless connections) and/or computer-readable storage media. Examples of computer-readable storage media include, but are not limited to, read only memory (ROM), random access memory (RAM), a register, cache memory, semiconductor memory devices, magnetic media such as, but not limited to, solid state drives (SSDs), hard disk drives (HDDs) and removable drives or disks, magneto-optical media, and/or optical media such as compact disc (CD)-ROM disks, and/or digital versatile disks (DVDs).

As shown in FIG. 5, computing device 500 may include computing system 504. Computing system 504 may include one or more processors (e.g., processor circuit 526), system memory 506, and a bus 532 that couples various system components, e.g., including system memory 506 to processor circuit 526. Processor circuit 526 may be an electrical and/or optical circuit implemented in one or more physical hardware electrical circuit device elements and/or integrated circuit devices (e.g., semiconductor material chips or dies), such as a central processing unit (CPU), a microcontroller, a microprocessor, and/or other physical hardware processor circuit. Processor circuit 526 may execute program code stored in a computer readable medium, such as program code of operating system 514, application programs 516, other programs 518, etc. Bus 532 may include one or more of any of several types of bus structures, e.g., including a memory bus or memory controller, a peripheral bus, an accelerated graphics port, and/or a processor or local bus using any of a variety of bus architectures. System memory 506 may include read only memory (ROM) 508 and random-access memory (RAM) 512. A basic input/output system 510 (BIOS) may be stored in ROM 508.

Computing system 504 may have one or more storage devices (e.g., a (removable) flash memory device, an SSD, an HDD for reading from and writing to a hard disk, a magnetic disk drive for reading from or writing to a removable magnetic disk, an optical disk drive for reading from or writing to a removable optical disk such as a CD ROM, DVD ROM, or other optical media). One or more storage devices may be connected to bus 532 by a respective interface. A storage device (e.g., and associated computer-readable media) may provide nonvolatile storage of computer-readable instructions, data structures, program modules and/or other data for computing system 504. Other types of hardware-based computer-readable storage media can be used to store data, such as flash memory cards, digital video disks, RAMs, ROMs, etc.

One or more program modules may be stored on computer-readable storage media. Programs may include operating system 514, one or more application programs 516, other programs 518, and/or program data 520. Application programs 516 or other programs 518 may include, for example, floating water circulator program (FWCP) 536, which may include computer program logic (e.g., computer program code or instructions) for viewing and/or interacting with (e.g., controlling) operation of an FWC. In some examples, FWCP 536 may be a phone application (app) downloadable for use with an FWC.

Computing device 500 (e.g., processor circuit 526) may execute FWCP 536 stored in storage device 534 (e.g., computer-readable storage media), which may generate an FWCP graphical user interface (GUI) 502 displayed by display 522 for viewing and/or interaction by a user (not shown). In various implementations, FWCP 536 may permit a user to view information and/or to control operation of one or more FWCs described herein with reference to FIGS. 1-9 (e.g., FWC 540).

Computing system 504 may include and/or may be coupled (e.g., via bus 532 and/or interfaces 524) to one or more (e.g., peripheral) devices (not shown), such as a touch screen or touch pad, display 522 (e.g., displaying a virtual keyboard and pointer for the touch pad or touch screen), microphone, joystick, game pad, a voice recognition system to receive voice input, a gesture recognition system to receive gesture input, or the like, speakers, microphone, software and/or hardware modules that provide wired or wireless connectivity, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, an HMD (e.g., video glasses, virtual reality and/or Augmented Reality (VR/AR) device), an activity tracker, one or more sensors (e.g., gyroscope, accelerometer, hall effect sensor, magnetometer, orientation sensor, proximity sensor, temperature sensor, time sensor; geolocation sensor; altimeter, light sensor, touch sensor, magnetometer, barometer, gesture sensor, biometric sensor, humidity sensor).

A user may enter commands and information into computing system 504 through one or more input devices (e.g., a touch screen or touch pad keyboard and/or pointer). One or more communication (e.g., input and/or output) devices may be connected to processor circuit 526 through one or more interfaces 524 coupled to bus 532 (e.g., through one or more interface circuits 530). For example, a touchscreen that a user may interact with based on images displayed by display 522 may be an interface and a touchscreen circuit may be a communication circuit that interfaces the touchscreen to bus 532 (e.g., and FWCP 536 execution by processor circuit 526. For example, an antenna that receives and transmits wireless signals may be an interface and a transceiver may be a communication circuit that interfaces the antenna to bus 532. Interfaces may include, for example, a connector or port, such as a USB port (e.g., USB-A, USB-C), through which a user may connect compatible devices.

Display (e.g., visual screen) 522 may be connected to bus 532 via an interface, such as a video adapter 528. Display 522 may be external to, or incorporated in computing device 500. Display 522 may display information. Display 522 may be integrated with a user interface for receiving user commands and/or other information (e.g., a touch screen or touch pad interface detecting input by touch, finger gestures, virtual keyboard). Computing device 500, computing system 504 and/or display 532 may be an HMD. As shown in FIG. 5, display 522 may display FWCP GUI 502 generated based on execution of FWCP 536 by processor circuit 526. FWCP GUI 502 may include, for example, a user interface for viewing FWC information, such as configuration and/or operational status, and/or controlling FWC operation, e.g., by configuring programs, thresholds, and so on.

Computing system 504 may connect to (e.g., and communicate with) a network (e.g., the Internet) through one or more interfaces (e.g., interfaces 524, such as a network interface). A network may include a wireless network (e.g., a mobile network, such as a cellular network).

Computer programs and modules (including application programs 532 and other programs 534) may be stored on one or more computer readable storage devices and/or media. In some examples, computer programs, when executed or loaded by an application, may (e.g., be configured and/or used to) enable computing system 504 to implement (e.g., in part) one or more features (e.g., controls) of example embodiments described herein. Example embodiments are directed to computer program products comprising computer-executable code or instructions stored on any computer-readable medium (e.g., storage device).

Figure 6:
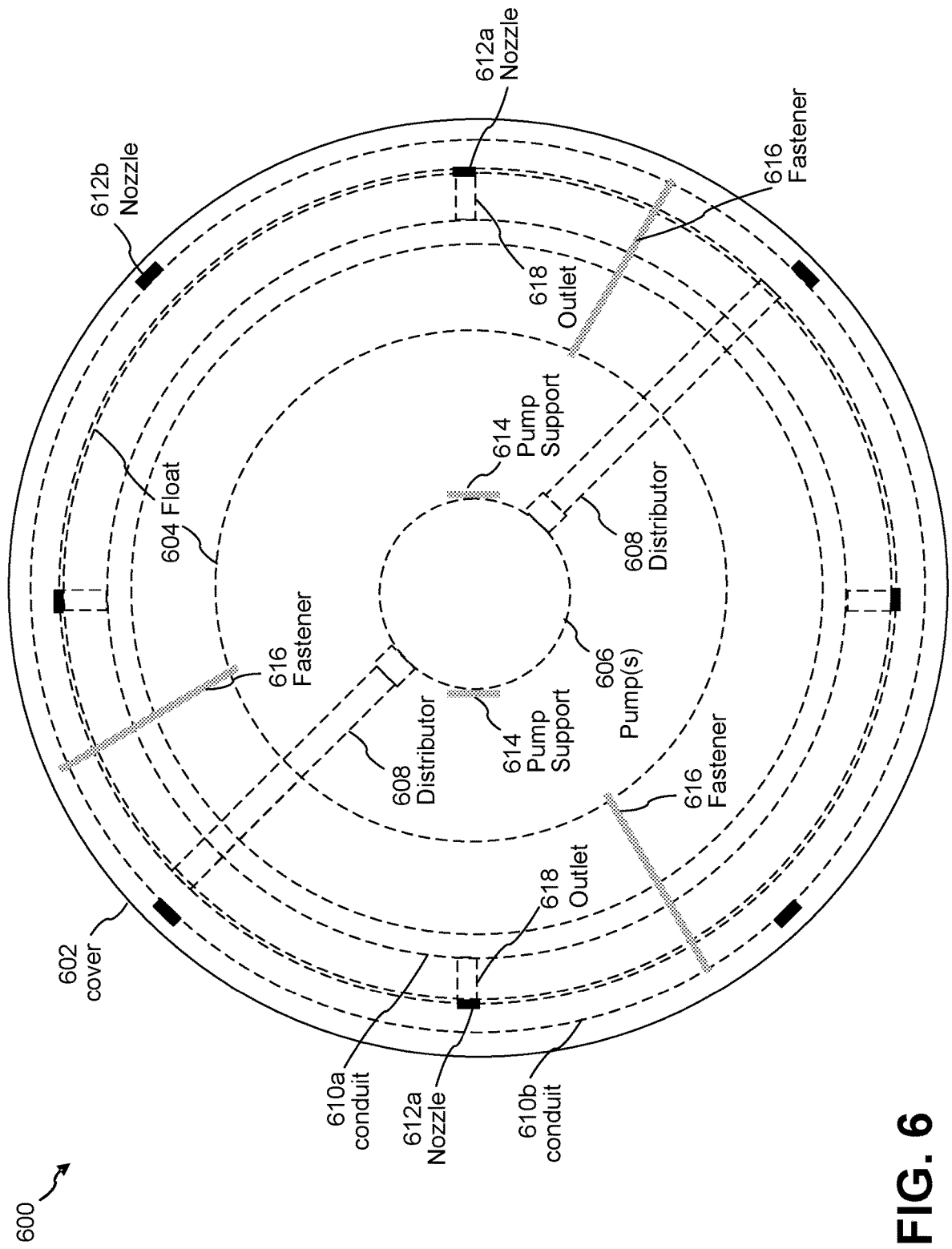
FIG. 6 illustrates an example of a top view of floating water circulators comprising a cap or lid over a tubular float, according to an embodiment.
Figure 7:
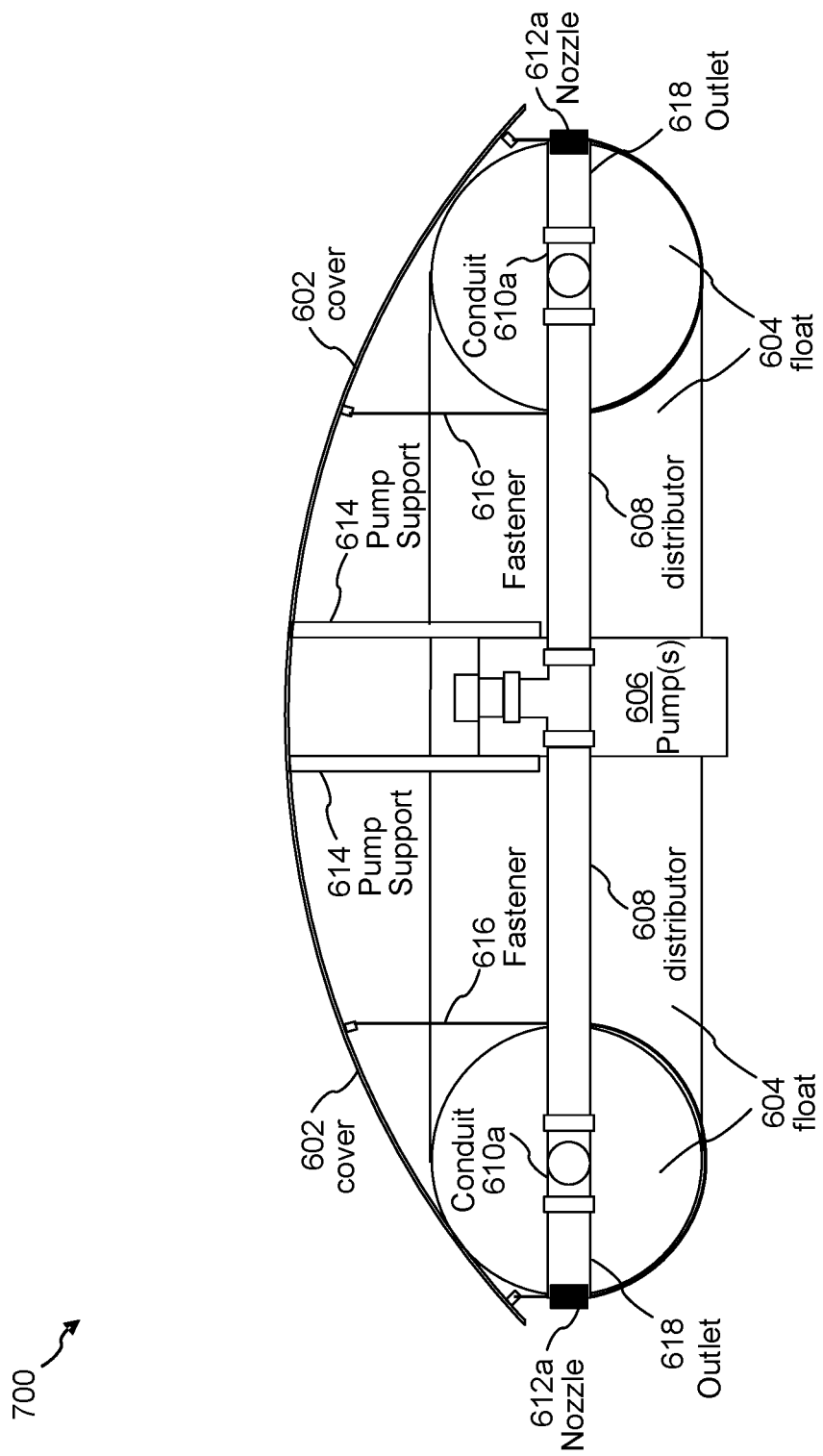
FIG. 7 illustrates a side view of the floating water circulator shown in FIG. 6 with conduit/discharge pipe inside the float, according to an embodiment.
Figure 8:
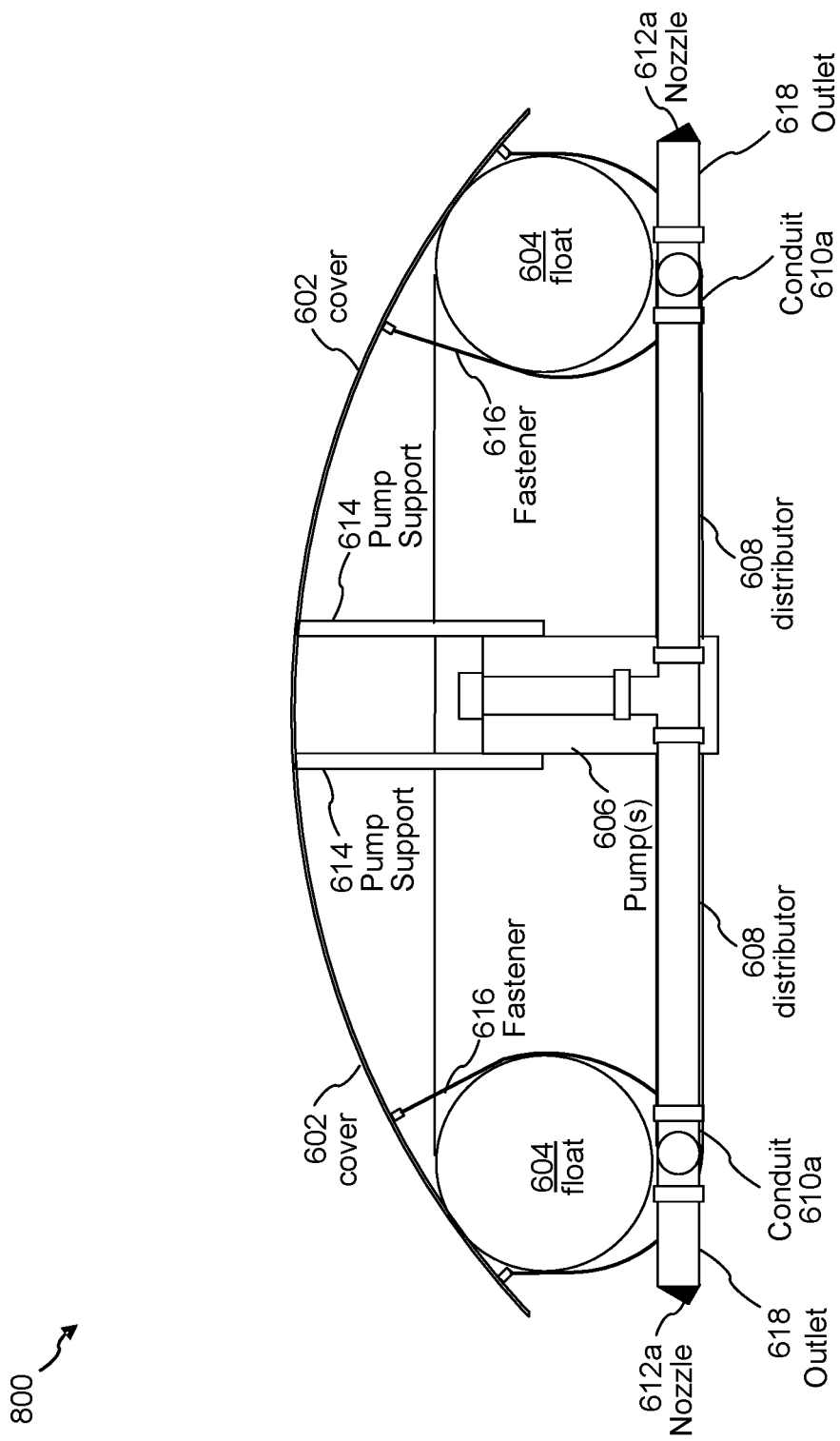
FIG. 8 illustrates a side view of the floating water circulator shown in FIG. 6 with conduit/discharge pipe under the float, according to an embodiment.
Figure 9:
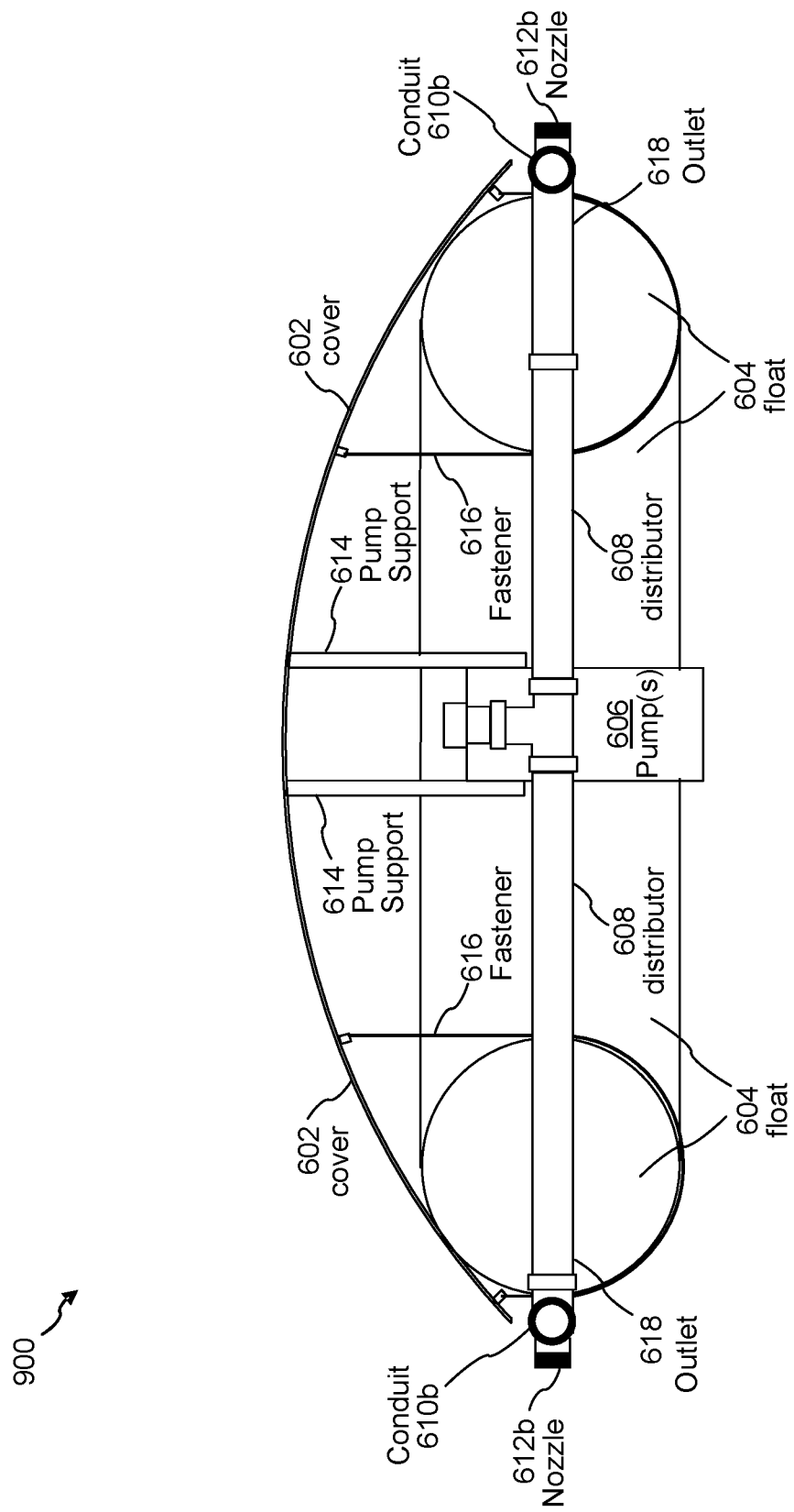
FIG. 9 illustrates a side view of the floating water circulator shown in FIG. 6 with conduit/discharge pipe around the float, according to an embodiment.

FIGS. 6-9 show top and side view examples of floating water circulators comprising a cap or lid over a tubular float. FIGS. 6-9 show an example of a (e.g., removable) cap over a float, where the float comprises a void under the cap, the void comprising the pump(s) and/or distributor. The void may be open to the water or the float and/or cap may include or may support a structure or frame, such as a bottom or platform (e.g., for pump(s), distributor(s), etc.). FIGS. 7-9 show different side views of the top view shown in FIG. 6. FIGS. 7-9 show varying locations of conduit/discharge pipe within float, under float or around (e.g., on an exterior side of) a float. In greater detail, FIG. 6 shows an example of a top view of a floating water circulator with three alternatives (e.g., among other alternatives): a distributor (e.g., discharge pipe) embedded in a tubular float (e.g., side view shown in FIG. 7), a distributor (e.g., discharge pipe) under a tubular float (e.g., side view shown in FIG. 8) or a distributor (e.g., discharge pipe) around a tubular float (e.g., side view shown in FIG. 9).

FIG. 6 illustrates an example of a top view of floating water circulators comprising a cap or lid over a tubular float, according to an embodiment. Example FWC 600 shows multiple examples of distributor 402 relative to FWC cover (e.g., cap) 602 and float (e.g., body) 404. FWC 600 may be provided with power from a power source (not shown), which may be remote, coupled to FWC 600 via power cable (not shown). Power source may be, for example, a battery under cover 602, a remote battery, generator, electrical outlet, etc.

Cover 602 may comprise a lid, cap, shell or other protective cover positioned over (e.g., resting on or fastened to) float 604. Cap 602 may comprise a protective material and/or coating, such as stainless steel, plate steel, Aluminum, fiberglass, plastic, rubber, or any other material. Material and/or one or more coatings or covers applies to material may be UV stable. Cap 602 may dissipate heat or be configured to reduce heat transfer to float 604. Cap 602 may comprise a protective shape (e.g., sloped, angled, curved, convex, arched, or dome shape). Cap 602 may be rigid and/or structural, capable of bearing weight of one or more other components, which may be held with tensile and/or compressive forces. Cap 602 may comprise a protective layer or coating (e.g., protective surface or layer, such as metal or a spray, paint or dip coating) to protect FWC 600 (e.g., float 604 and/or other components) against damage by sunlight, impacts, water, and/or ice accumulation.

Float 604 may comprise one or more materials in one or more shapes configured to float in a body of water. In some examples, float 604 may comprise a ring, tube or doughnut shape, with exterior/outer and interior/inner float sides. In some examples, float 604 may have a tub shape (e.g., circular tub shape) with a bottom. In some examples, float 604 may comprise one or more pontoons or cylinders. In some examples, float 604 may comprise weighting or ballast material(s), e.g., to cause float 604 to displace water for stability and/or wind resistance of FWC 600 and/or placement of ports or nozzles relative to a surface of a body of water. Float 604 may comprise, e.g., at least in part, material less dense than water, e.g., foam, air or other gas captured in a container, such as a rubber tube, so that float 604, weighted by all other components in FWC 600, floats in a body of water.

Pump(s) 606 may be attached to/supported by (e.g., suspended under) cover 602 and/or float 604. Pump(s) 606 may be grouped to feed a common chamber or may feed separate distributors and/or conduits. As shown in FIG. 6, one or more pumps 606 and pumped water distributors 608 may be configured in the central area of float 604 under cover 602. Pump(s) 606 (e.g., and distributor(s) 608) may be supported (e.g., suspended) for example, by cover 602 and/or float 604. The support/suspension may be adjustable to raise and lower pump(s) 606 relative to a body of water. Pump(s) 606 may pump water into distributor 608. Pumped water may be dispersed from distributor 608 through conduit(s) 610*a* to nozzles 612*a* at outlets 618 and/or through conduit(s) 610*b* to nozzles 612*b*. Pump(s) 606 may be positioned, for example, above the bottom of float 604 with inlet tube(s) protruding below float 604, suspended below float 604, partially suspended below float 604, etc. In any position of pump(s) 606 relative to float 604, pump(s) 606 may be oriented horizontally on a side, vertically, angled, etc.

Distributor(s) 608 may be, for example, discrete (e.g., plastic plumbing) component(s) clamped or glued together and/or integrated (e.g., formed) in float 604 (e.g., if float 604 is not open in the center). Distributor 608 may receive pumped water from pump(s) 606 and provide/disperse the pumped water to conduits 610*a* and/or 610*b*.

Conduit 610a (e.g., in the top view shown in FIG. 6) may represent conduit embedded in float 604 (e.g., as shown in FIG. 7) or conduit above or below float 604 (e.g., as shown in FIG. 8). Conduit 610b may represent conduit around (e.g., encircling) float 604 (e.g., as shown in FIG. 9). Conduit 610a positioned below float 604 or conduit 610b positioned around float 604 may be held in place, for example, by a friction fit, by one or more fasteners (e.g., zip ties, bands), etc. Conduit 610a and/or 610b may be referred to as discharge pipe leading to outlets 618 and nozzles 612a and/or 612b.

Nozzles 612a and/or 612b may be configured to eject pumped water to cause ripples or waves in a body of water without significant splashing. Nozzles 612a and/or 612b may eject pumped water at or below a waterline of a body of water. In some examples (e.g., if float 604 is a tube filled with gas), gas (e.g., air) may be added to or removed from float 604 to adjust the position of nozzles 612a and/or 612b relative to a waterline of a body of water. In some examples, ballast may be added to or removed (e.g., under cover 602) to adjust the position of nozzles 612a and/or 612b relative to a waterline of a body of water.

Pump supports 614 may attach to cover 602 and/or float 604. Pump supports 614 may support (e.g., attach to) one or more pumps 606.

Fasteners 616 may fasten cover 602 to float 604. In some examples, pump supports 614 may be integrated with fasteners 616 to join cover 602, float 604 and pump(s) 606. In some examples (e.g., as shown in FIGS. 7-9), fasteners 616 may comprise bands or loops around float and/or distributor(s) 608 coupled to connection points on the underside of cover 602. In some examples, float 604 may be manufactured with attachment points, such as welded rubber loops. Cover 602 may be manufactured with attachment points, such as metal loops. Removable fasteners (e.g., spring loaded cables or ratchet straps with hooks or carabiners, tarp straps with hooks or carabiners, and so on) may be attached to attachment points under cover 602 and on float 604.

FIG. 7 illustrates a side view of the floating water circulator shown in FIG. 6 with conduit/discharge pipe inside the float, according to an embodiment. Example FWC 700 shows conduit 610a inside (e.g., embedded in) float 604. Float 604 may be for example, foam formed around conduit 610a, plastic drilled and sealed around conduit 610a, rubber inner tube with sealed fittings around conduit 610a, etc. A protective shell or coating may be applied on or around float 604.

FIG. 8 illustrates a side view of the floating water circulator shown in FIG. 6 with conduit/discharge pipe under the float, according to an embodiment. Example FWC 800 shows conduit 610a under float 604. Float 604 may be for example, foam, plastic, rubber inner tube, etc. As shown in FIG. 8, in some examples, fasteners 616 may loop under conduit 610a to join float 604 and conduit 610a to cover 602. In some examples, conduit 610a may be supported separately, e.g., joined to float 604 and/or to cover 602. In some examples, float 604 may be less round (e.g., oblong) to place cover 602 closer to the waterline (e.g., reduce center of gravity of FWC 800). In some examples, float 604 and/or the underside of cover 602 may be heavier (e.g., loaded with ballast) to sink FWC 800 in a body of water at a desired level so that pumped water expelled from nozzles 612a causes ripples or waves with insignificant splashing. In some examples, e.g., if nozzles 612a are submerged, nozzles 612a may be turned upwards, for example, so that pumped water expelled from nozzles 612a causes ripples or waves (e.g., with insignificant splashing).

FIG. 9 illustrates a side view of the floating water circulator shown in FIG. 6 with conduit/discharge pipe around the float, according to an embodiment. Example FWC 900 shows distributor 608 passing through float 604. Float 604 may be for example, foam formed around distributor 608, plastic drilled and sealed around distributor 608, rubber inner tube with sealed fittings around distributor 608, etc. Example FWC 900 shows conduit 610b outside the perimeter of float 604. Float 604 may be for example, foam, plastic, rubber inner tube, etc. In some examples, with conduit 610b around the perimeter of float 604, cover 602 may be extended beyond/over nozzles, e.g., as a UV shield, awning, and bumper guard to protect nozzles from UV rays, hail, bumps, ice, etc. In some examples, fasteners 616 may loop around conduit 610b to join float 604 and conduit 610b to cover 602. In some examples, conduit 610b may be supported separately, e.g., joined to float 604 and/or to cover 602. In some examples, float 604 may be less round (e.g., oblong) to place cover 602 closer to the waterline (e.g., reduce center of gravity of FWC 900). In some examples, float 604 and/or the underside of cover 602 may be heavier (e.g., loaded with ballast) to sink FWC 900 in a body of water at a desired level so that pumped water expelled from nozzles 612b causes ripples or waves (e.g., with insignificant splashing).

Systems, methods, and instrumentalities are disclosed for a floating water circulator (e.g., water rippler). Floating water circulators may be used to circulate water to provide kinetic energy, mixing, and/or temperature destratification. Water may be expelled at or near the surface (e.g., by providing undulations, such as waves, ripples or other surface disturbances with insignificant splashing) to retard the formation of ice and/or insect reproduction in exposed water containers that may have varying depth and/or debris (e.g., stock tanks). Operating at a fraction of the power consumption and associated cost of a heater, a floating water circulator may include a float configured to maintain buoyancy of the floating water circulator in a body of water, e.g., to rise and fall with water surface. A pump may be configured to pump subsurface water from the body of water into a distributor. The distributor may be configured to receive (e.g., from one or more inlets), distribute and discharge the pumped water in multiple directions at or near the surface of the body of water through a plurality of outlets located in a side and/or a bottom of the floating water circulator to ripple a surface of the body of water while suppressing/inhibiting splashing.

In some examples, a floating water circulator (FWC) may be implemented to reduce ice buildup and/or insect breeding. An FWC may comprise, for example, a float configured to maintain buoyancy of the floating water circulator in a body of water (e.g., a stock tank where water level/depth varies plus acquires debris); a pump configured to pump water from the body of water into a distributor; and a distributor configured to receive, distribute and discharge (e.g., expel) the pumped water in a plurality of directions on to or in to (e.g., at, above, below surface of) the body of water through a plurality of outlets (e.g., ports with or without nozzle tips, where water pressure may be adjusted/balanced to maintain FWC position) located in a side or bottom of the floating water circulator to ripple a surface of the water without splashing.

In some examples, the distributor may include conduit external to the float or external to an exterior body of the floating water circulator. For example, the distributor may comprise a conduit/tube around, under, and/or embedded in the float. The conduit/tube may comprise the plurality of outlets.

In some examples, the distributor may be inside the float (e.g., protected, embedded within the float) or within an exterior of the floating water circulator. For example, the distributor may comprise a conduit/channel formed in the float or a tube inside the float. The conduit/channel may comprise the plurality of outlets.

In some examples, the distributor may comprise an input chamber that receives the pumped water and provides the pumped water to the plurality of outputs (e.g., equalizing water pressure/flow out of outlets).

A path taken by pumped water from inlet to outlet of the distributor may have any shape, e.g., rectangular, square, round, oval, etc. A chamber (e.g., if it exists) in the distributor may have any shape suitable to support distributing the pumped water on or in to the body of water through the plurality of outlets. A chamber may be referred to as a reservoir or vessel.

In some examples, the plurality of outlets may be configured to discharge the pumped water at a surface of the body of water to ripple the surface of the body of water without (e.g., significant) splashing.

In some examples, the plurality of outlets may be configurable (e.g., adaptable/variable, closable/pluggable, selectable open outlet positions, nozzle size, direction, elevation, angle) for adaptation of the floating water circulator to operating conditions (e.g., at least one of the shape of a container of the body of water, the dimensions of a container of the body of water, a temperature of the air, a temperature of the water, the pump, and/or a user preference).

For example, the plurality of outlets may be configured (e.g., by a user/installer/operator) to expel water with equal force on opposing sides (e.g., to maintain a position of the floating water circulator in the body of water).

In some examples, the float may comprise the distributor (e.g., formed or embedded in rigid insulation). The float may comprise the plurality of outlets through (e.g., a side or a bottom of) the float.

In some examples, the float may comprise an inflatable device, rigid insulation, etc.

In some examples, a float (e.g., rigid insulation) may comprise the distributor as a water flow channel formed in the float or a hose, pipe or tube embedded in the float (e.g., protected and insulated/surrounded by the rigid insulation, such as spray foam).

In some examples, a float may comprise a support (e.g., flange) configured to retain the pump (e.g., join the float and pump).

In some examples, an FWC may comprise separable pieces, such as an upper piece coupled or configured to couple, seal, or clamp to a lower piece, e.g., by a hinge, removable clamp, bolt, etc. The upper piece and lower piece may be foam with a coating or shell around foam, etc. The pieces may have or may form one or more accessible interior cavities, which may provide access to at least one replaceable component and/or may house at least a portion of at least one of the float, distributor, pump, ballast, electrical connection, etc.

In some examples, separable pieces may comprise a first piece (e.g., a cap, lid, cover, dome) with a protective shape (e.g., sloped/angled/curved-convex/dome), layer, or coating (e.g., protective surface or layer, such as metal or spray/paint/dip coating) protecting the FWC against damage by sunlight, impacts, water and ice accumulation.

In examples, a pump (e.g., wet/submersible, dry/non-submersible or inline pump, such as with one or more tubes into the body of water) may be partially or fully recessed (e.g., embedded) within the floating water circulator. For example, the float pump may be partially or fully recessed (e.g., embedded or concealed) within the float (e.g., under the dome cap).

In some examples, a pump may be variable (e.g., statically or dynamically adaptable/configurable) to adapt the floating water circulator to at least one of the shape of a container of the body of water, the dimensions of a container of the body of water, a temperature of the air, a temperature of the water, or a user preference. A pump may have variable flow with automatic and/or manual control.

In some examples, a pump may be configured to remove debris that is clogging or may clog a water intake, for example, by temporarily stopping, slowing, or reversing pump flow and/or by redirecting a portion of the pumped water to deflect debris at water intake of the pump.

In some examples, an FWC may comprise a controller to control the pump to vary (e.g., modulate) at least one of a direction of flow (e.g., reverse flow to periodically clean based on a timer and/or aperiodically based on detection of reduced flow/clog detection) or a pump flow rate (e.g., increase or decrease flow based on events and/or thresholds, such as air and/or water temperature sensor values, and/or based on detected clogging).

In some examples, a diverter may be configured to divert a portion of the pumped water to divert debris from a water intake for the pump.

In some examples, an FWC may comprise a support (e.g., coupler, retainer, mount, housing, bracket, strut, carrier, frame, holder, enclosure, plastic or metal bolts threaded to a nut, clamp) configured to retain (e.g., attach, mount) the pump to the float. For example, a pump can be inside a cavity, held inside and suspended below an FWC, suspended completely below an FWC, and so on, such that a support can be internal and/or external to an FWC. For example, a support may comprise a flange internal to the floating water circulator (e.g., mounted to the float or lower piece), where the pump may rest on the flange and protrude, at least partially, below a body of the FWC (e.g., float or lower piece). In some examples, a support may comprise a support suspended from and protruding below a body of an FWC. For example, a support may include one or more supports embedded in or through the lower piece or float portion of an FWC.

In some examples, a pump controller may use a flow reduction sensor to determine whether to vary (e.g., modulate) the pump (e.g., to clear debris clogging a water intake).

In some examples, a pump controller may use a temperature sensor to determine whether to vary (e.g., modulate) the pump (e.g., increase flow when cold temperature is below a threshold or when a hot temperature is above a threshold).

In some examples, an FWC may include a swivel bearing, e.g., to permit the floating water circulator to rotate without twisting at least one of a tether or an electrical cord as the floating water circulator moves in the body of water.

In some examples, an FWC may comprise a body configured to maintain buoyancy of the floating water circulator in a body of water; and a water rippler configured to pump water from below a surface of the body of water and discharge the pumped water at a surface of the body of water to ripple the surface of the body of water (e.g., to suppress splashing).

In some examples, a floating water circulator may (e.g., further) comprise a cavity or compartment in the body configured to provide access to at least a portion of the water rippler.

In some examples, the base may comprise a float forming at least two opposing sides of the cavity or compartment (e.g., pontoons, cylinders, a tube encircling the cavity or compartment, and so on).

In some examples, a floating water circulator may (e.g., further) comprise a cap configured to cover at least a portion of the body.

In some examples, the water rippler may comprise a distributor configured to distribute and discharge the pumped water. The distributer may be at least partially embedded in the body.

In some examples, an FWC may comprise a body configured to maintain buoyancy of the floating water circulator in a body of water; a pump configured to pump water from the body of water into a distributor; a distributor configured to receive, distribute and discharge the pumped water in a plurality of directions onto or into the body of water through a plurality of outlets located in a side or bottom of the floating water circulator to ripple a surface of the water (e.g., while suppressing or minimizing splashing); and a cavity or compartment configured to provide access to at least one of the pump or the distributor.

In some examples, an FWC may comprise a support configured to retain the pump to the float. The accessible interior cavity may be configured to provide access to at least a portion of the support.

In some examples, the FWC may (e.g., further) comprise a cap configured to cover at least a portion of the body. The cavity or compartment may be protected under the cap installed over the body.

In some examples, the distributor may include conduit external to the body. The cap may be configured (e.g., extended) to cover (e.g., protect) the conduit.

While the disclosed technology has been described with respect to a limited number of examples, it should be understood that they have been presented by way of example only, and not limitation. It will be understood by those skilled in the relevant art(s) that the spirit and scope of the subject matter of the present application encompasses a wide variety of implementations, including various changes in form and details to disclosed examples. Embodiments are not limited to the functional blocks, detailed examples, steps, order or the entirety of subject matter presented in the examples. An embodiment of a device, apparatus or machine may comprise any one or more features described herein in any configuration. An embodiment of a method or process may comprise any process described herein, in any order, with any number of steps, using any modality. The appended claims encompass examples and features described herein, modifications and variations thereto as well as additional examples and features that fall within the true spirit and scope of the disclosed subject matter.

What is claimed:

1. A floating water circulator comprising:
   a float configured to maintain buoyancy of the floating water circulator in a body of water;
   a pump configured to pump water from the body of water into a distributor; and
   a distributor configured to receive, distribute and discharge the pumped water in a plurality of directions onto or into the body of water through a plurality of outlets located in a side or bottom of the floating water circulator to ripple a surface of the body of water.

2. The floating water circulator of claim 1, wherein the distributor includes conduit external to the float or external to an exterior body of the floating water circulator.

3. The floating water circulator of claim 1, wherein the distributor includes conduit inside the float or within an exterior of the floating water circulator.

4. The floating water circulator of claim 3, wherein the conduit comprises a channel formed in the float.

5. The floating water circulator of claim 1, wherein the distributor comprises an input chamber that receives the pumped water and provides the pumped water to a plurality of conduits leading to the outputs.

6. The floating water circulator of claim 1, wherein the plurality of outlets are configurable for adaptation of the floating water circulator to operating conditions.

7. The floating water circulator of claim 1, wherein the float comprises at least a portion of the distributor formed or embedded in the float.

8. The floating water circulator of claim 1, further comprising:
   a cap configured to cover at least a portion of the float; and
   a void, cavity or compartment formed under the cap installed over the float configured to house at least one of the pump or the distributor.

9. The floating water circulator of claim 8, wherein a void, cavity, or opening in the float forms at least a portion of the void, cavity or compartment formed under the cap installed over the float.

10. The floating water circulator of claim 1, wherein the floating water circulator comprises separable components including at least first and second components that form at least one accessible cavity for access to at least one of the distributor, pump, an electrical connection or ballast.

11. The floating water circulator of claim 1, wherein the pump is partially or fully recessed within the float or the floating water circulator.

12. The floating water circulator of claim 1, further comprising:
    a controller that controls the pump to vary pump operation based on at least one of a timer, a temperature, or inlet flow.

13. The floating water circulator of claim 1, further comprising:
    a diverter configured to divert a portion of the pumped water to divert debris from the pump.

14. The floating water circulator of claim 1, further comprising:
    a swivel bearing configured to permit the floating water circulator to rotate without twisting at least one of a tether or an electrical cord as the floating water circulator moves in the body of water.

15. A floating water circulator comprising:
    a body configured to maintain buoyancy of the floating water circulator in a body of water; and
    a water rippler configured to pump water from below a surface of the body of water and discharge the pumped water in a plurality of directions onto or into the body of water to ripple the surface of the body of water.

16. The floating water circulator of claim 15, further comprising:
    a cavity or compartment in the body configured to provide access to at least a portion of the water rippler; and
    a cap configured to cover at least a portion of the body or the cavity or compartment in the body.

17. The floating water circulator of claim 15, wherein the water rippler comprises a distributor configured to distribute and discharge the pumped water and wherein the distributer is at least partially embedded in the body.

18. A floating water rippler comprising:
a body configured to maintain buoyancy of the floating water circulator in a body of water;
a pump configured to pump water from the body of water into a distributor;
a distributor configured to receive, distribute and discharge the pumped water in a plurality of directions onto or into the body of water through a plurality of outlets located in a side or bottom of the floating water rippler to ripple a surface of the water; and
a cavity or compartment configured to provide access to at least one of the pump or the distributor.

19. The floating water circulator of claim 18, further comprising:
a cap configured to cover at least a portion of the body, wherein the cavity or compartment is under the cap installed over the body.

20. The floating water circulator of claim 19, wherein the distributor includes conduit external to the body and wherein the cap is configured to cover the conduit.

\* \* \* \* \*